US007526766B2

(12) United States Patent
Asai et al.

(10) Patent No.: US 7,526,766 B2
(45) Date of Patent: Apr. 28, 2009

(54) TERMINAL DEVICE FOR RESOLVING CONFLICTS WHEN MULTIPLE FUNCTIONS ACCESS A RESOURCE

(75) Inventors: Mao Asai, Yokosuka (JP); Nobuyuki Watanabe, Sayama (JP); Masayuki Tsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 527 days.

(21) Appl. No.: 10/850,867

(22) Filed: May 21, 2004

(65) Prior Publication Data

US 2005/0021876 A1 Jan. 27, 2005

(30) Foreign Application Priority Data

May 22, 2003 (JP) ............................. 2003-144782

(51) Int. Cl.
*G06F 9/46* (2006.01)
(52) U.S. Cl. ...................... 718/103; 718/104; 719/310; 719/313
(58) Field of Classification Search ......... 719/310–314, 719/213, 318; 718/100–104; 710/1, 39; 709/226; 370/444
See application file for complete search history.

(56) References Cited

U.S. PATENT DOCUMENTS

| | | | | |
|---|---|---|---|---|
| 5,596,728 A | * | 1/1997 | Belmont | .................... 710/304 |
| 5,826,109 A | * | 10/1998 | Abramson et al. | ............ 710/39 |
| 5,835,766 A | * | 11/1998 | Iba et al. | .................... 718/104 |
| 6,179,489 B1 | * | 1/2001 | So et al. | .................... 718/102 |
| 6,363,434 B1 | | 3/2002 | Eytchison | |
| 6,631,394 B1 | * | 10/2003 | Ronkka et al. | .............. 718/100 |
| 6,904,599 B1 | * | 6/2005 | Cabrera et al. | .............. 719/328 |
| 6,910,028 B2 | * | 6/2005 | Chan et al. | .................... 706/47 |
| 6,944,642 B1 | * | 9/2005 | Hopmann et al. | ........... 709/203 |
| 7,062,766 B2 | * | 6/2006 | Ronkka et al. | .............. 718/100 |
| 7,150,020 B2 | * | 12/2006 | Kalhour | ...................... 718/104 |
| 7,187,478 B2 | * | 3/2007 | Mikame et al. | ............. 358/468 |
| 2003/0172139 A1 | * | 9/2003 | Srinivasan et al. | .......... 709/221 |
| 2004/0023646 A1 | | 2/2004 | Inami et al. | |

FOREIGN PATENT DOCUMENTS

| | | |
|---|---|---|
| EP | 0 964 332 A1 | 12/1999 |
| GB | 2 364 143 A | 1/2002 |
| JP | H05-158672 A | 6/1993 |

(Continued)

OTHER PUBLICATIONS

College Text Book, "Computer Operating System", 1998.

(Continued)

*Primary Examiner*—Van H Nguyen
(74) *Attorney, Agent, or Firm*—Brinks Hofer Gilson & Lione (57) ABSTRACT

In a case that communication functions configuring a host system use origination functions (resources), when JAM ("Java Application Manager") stored in a mobile phone receives, from KVM ("K Virtual Machine"), request data indicating that a first Java AP ("application") requests to execute an origination function, JAM executes or cancels an execution request by the first Java AP in accordance with an instruction input by a user. Further, when JAM cancels an execution request by the first Java AP, JAM provides to KVM notification data indicating that an execution request is cancelled.

16 Claims, 8 Drawing Sheets

FOREIGN PATENT DOCUMENTS

| | | |
|---|---|---|
| JP | H07-245663 A | 9/1995 |
| JP | H07-295838 A | 11/1995 |
| JP | H10-105297 | 4/1998 |
| JP | 2003-099273 A | 4/2003 |
| JP | 2004-078936 A | 3/2004 |
| WO | WO 01/84301 A2 | 11/2001 |
| WO | WO 02/091180 A2 | 11/2002 |

OTHER PUBLICATIONS

Chinese Office Action mailed Feb. 10, 2006.
Office Action from the European Patent Office, application No. 012 239.2-1243, mailing date Apr. 14, 2008.

* cited by examiner

TERMINAL DEVICE FOR RESOLVING CONFLICTS WHEN MULTIPLE FUNCTIONS ACCESS A RESOURCE

This application claims priority under 35 U.S.C. §119 to Japanese Patent Application No. 2003-144782 filed May 22, 2003, the entire content of which is hereby incorporated by reference.

TECHNICAL FIELD

The present invention relates to techniques for solving conflicts which occur when a resource is to be used by a plurality of functions in a terminal device.

BACKGROUND ART

In the prior art for solving conflicts, when input/output (hereafter, referred to as "IO") requests to an IO device (resource) are made, a priority is allocated for data indicating each IO request and the data is stored in a memory, and then an IO process for each IO request is run on the basis of the priority allocated to the request data (e.g. JP1998-105297).

In the above art, IO processes are executed in order of the priority allocated to the request data. Consequently, execution of an IO process for an IO request to which a low a priority is allocated may be delayed indefinitely.

DISCLOSURE OF INVENTION

To overcome the above problems, the present invention provides techniques for solving conflicts which occur when a resource is used by a plurality of functions to be run by a terminal device.

To solve the above problems, the present invention provides a terminal device comprising: execution means for executing a plurality of programs; conflict determination means for determining whether a resource is used by a second application executed in compliance with a program executed by the execution means, the resource requested to be used by a first application executed in compliance with a program executed by the execution means; display means for, in a case that the determination made by the conflict determination means is positive, displaying a screen for prompting a user to input an instruction; execution/cancellation means for executing or canceling an request from the first application in accordance with the input instruction; and notification means for providing notification to the first application that a request is cancelled, in a case that a request is cancelled by the execution/cancellation means.

According to the above terminal device, in a case that a resource requested to be used by a first application is used by a second application, the above terminal device displays a screen for prompting a user to input an instruction, and executes or cancels a request from a first application in accordance with the input instruction; and the terminal provides notification to a first application that a request is canceled (process 1).

Further, the present invention provides a terminal device comprising: conflict determination means for determining whether a resource is used by a second application executed in compliance with a program executed by the execution means, the resource requested to be used by a first application executed in compliance with a program executed by the execution means; comparison means for comparing, in a case that the determination made by the conflict determination means is positive, a priority provided to the first application with a priority provided to the second application; comparison execution/cancellation means for executing or canceling an request from the first application on the basis of the comparison result determined by the comparison means; and notification means for providing notification to the first application that a request is cancelled, in a case that a request is cancelled by the comparison execution/cancellation means.

According to the above terminal device, in a case that a resource requested to be used by a first application is used by a second application, the terminal device compares a priority allocated to the first application with a priority allocated to the second application, executes or cancels a request from the first application on the basis of the comparison result, and provides notification to a first application that a request is canceled (process 2).

Further, the present invention provides a terminal device comprising: conflict determination means for determining whether a resource is used by a second application executed in compliance with a program executed by the execution means, the resource requested to be used by a first application executed in compliance with a program executed by the execution means; priority determination means for determining, in a case that the determination made by the conflict determination means is positive, whether a priority is provided to both the first application and the second application; comparison means for comparing, in a case that the determination made by the priority determination means is positive, a priority provided to the first application with a priority provided to the second application; display means for displaying, in a case that the determination made by the priority determination means is negative, a screen for prompting a user to input an instruction; execution/cancellation means for executing or canceling a request from the first application in accordance with either the comparison result by the comparison means, or the input instruction; and notification means for providing notification to the first application that a request is cancelled, in a case that a request is cancelled by the execution/cancellation means.

According to the terminal device, in a case that a resource requested to be used by a first application is used by a second application, the above process 1 and process 2 are executed.

BEST MODE FOR RUNNING THE INVENTION

The embodiments will now be described with reference to the drawings. Like numerals denote like elements in the figures. Hereafter, an operating system is referred to as "OS", system software is referred to as "SS", an application is referred to as "AP", an application program is referred to as "APP", an APP configured by a byte code in compliance with Java requirements is referred to as "Java APP", and an APP which is not a Java APP is referred to as "non-Java APP".

1. First Embodiment

<1-1. Configuration>

Figure 1:
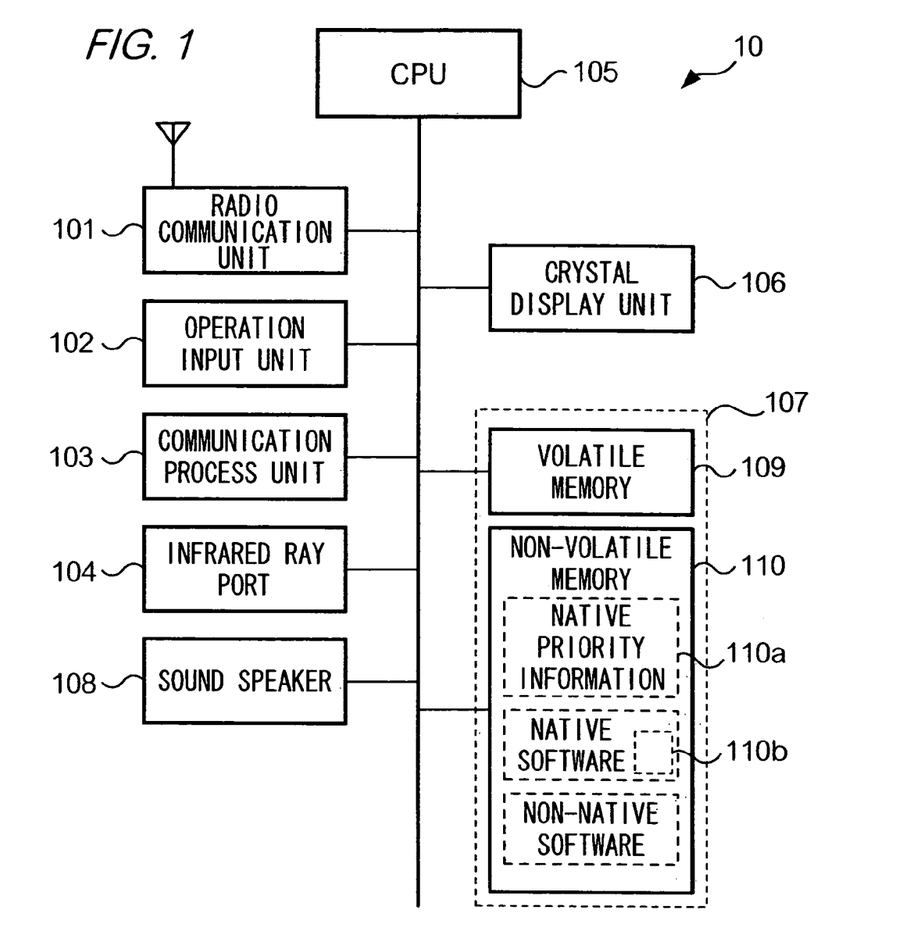
FIG. 1 is a block diagram denoting the hardware configuration of mobile phone 10 according to the first embodiment of the present invention.

FIG. 1 is a block diagram denoting the hardware configuration of mobile phone 10 according to the first embodiment of the present invention. As shown in this figure, mobile phone 10 has the same hardware configuration as a standard terminal, and comprises: radio communication unit 101 running radio communication with base stations in mobile communication networks (not shown); operation input unit 102 which has a keypad for operation by a user and which outputs signals to CPU 105 corresponding to the user's input operation; communication process unit 103 which runs a call connection or disconnection with a partner device through a mobile communication network; infrared ray port 104 for communicating with external devices using a communication standard such as IrDA (Infrared Data Association); sound speaker 108 which outputs alarms or music, and communication microphones and communication speakers (neither of which is shown).

Further, as shown in the figure, memory unit 107 is comprised of volatile memory 109 and non-volatile memory 110. Native software and native priority information 110a are written in non-volatile memory 110. Native software is software pre-installed in non-volatile memory 110 prior to the sale of mobile phone 10. There are two types of native software; native SS and native APP.

OS (operation system) software is exemplified as native SS, a WWW (World Wide Web) browser program, a mailer program, a call program, an infrared ray communication program, a music replay program, an animation replay program, a KVM (K Virtual Machine) program; and JAM (Java Application Manager) programs 110b are exemplified as native APPs. Also, exemplified native APPs are non-Java APPs; and a Java APP, pre-installed in non-volatile memory 110 prior to the sale of mobile phone 10, is a native APP.

Figure 2:
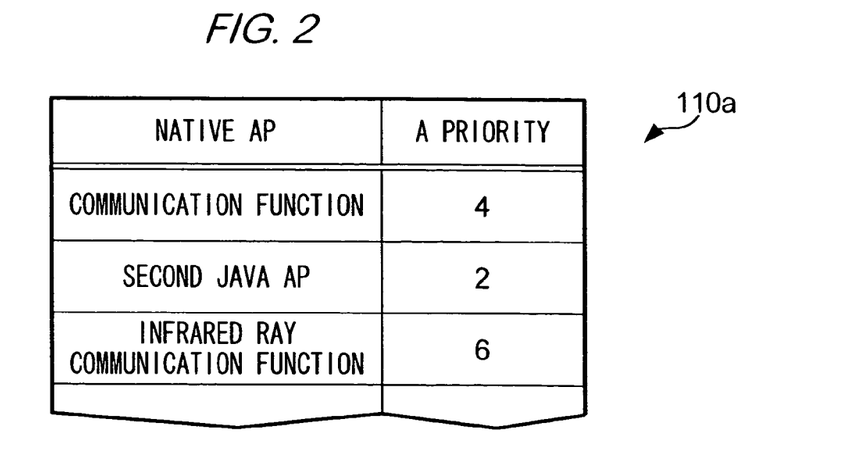
FIG. 2 is a diagram denoting an example of native priority information 110a in mobile phone 10.

Native priority information 110a is information indicating priority of each native APP, the information being determined by a designer of mobile phone 10. An example of native priority information 110a is shown in FIG. 2. According to FIG. 2, each number indicates a priority, and a high number indicates a high priority. The use of priorities will be described later.

Non-volatile memory 110 is also used for storing non-native software. Non-native software is software written in non-volatile memory 110 by a user of mobile phone 10. CPU 105 enables mobile phone 10 to run a multi-task OS (hereafter, referred to as just "OS") by reading out OS software stored in non-volatile memory 110, and executing it at the time of switching on mobile phone 10. "OS" manages resources used by AP. Hereafter, the resource to be managed is referred to as "resource".

There are three types of resources: "hardware resource"; "software resource"; and "network resource". Examples of "hardware resource" are the hardware configuring mobile phone 10 and outside devices such as UIM (User Identity Module) which may be used in cooperation with mobile phone 10. An example of "software resource" is the data stored in memory unit 107. Examples of "network resource" are: a radio resource such as a radio channel to be used, when mobile phone 10 performs a radio communication with a mobile communication network; a communication resource such as a packet transmission line; or a transmission line for connecting a line.

Further, there is a resource combining a plurality of resources such as an origination function, a standard sound output function, an infrared ray communication execution function, a music replay function, and an animation replay function. An origination function is a function for originating a call and connecting a transmission line by preparing resources such as radio communication unit 11 and a radio channel, which are necessary for making a call. A standard sound output function is a pre-set function for outputting standard sound, such as an alarm or operation sound of operation input unit 102, which uses sound speaker 108. An infrared ray communication execution function is a function for running an infrared ray communication in compliance with a standard of IrDA (Infrared Data Association) by using infrared ray port 104. A music replay function is a function for replaying music data stored in non-volatile memory 110, using sound speaker 108. An animation replay function is a function for replaying animation data stored in non-volatile memory 110, and displaying it on crystal display unit 106.

A large resource (=the resource combining a plurality of functions) described above is provided as non-Java AP executed in compliance with Java APPs run by OS. However, non-Java AP is not limited to these resources. For example, JAM 110c to be run in compliance with JAM program 110b, KVM, a WWW browser, a mailer, a call function and an infrared ray communication execution function are also examples of non-Java AP.

Figure 3:
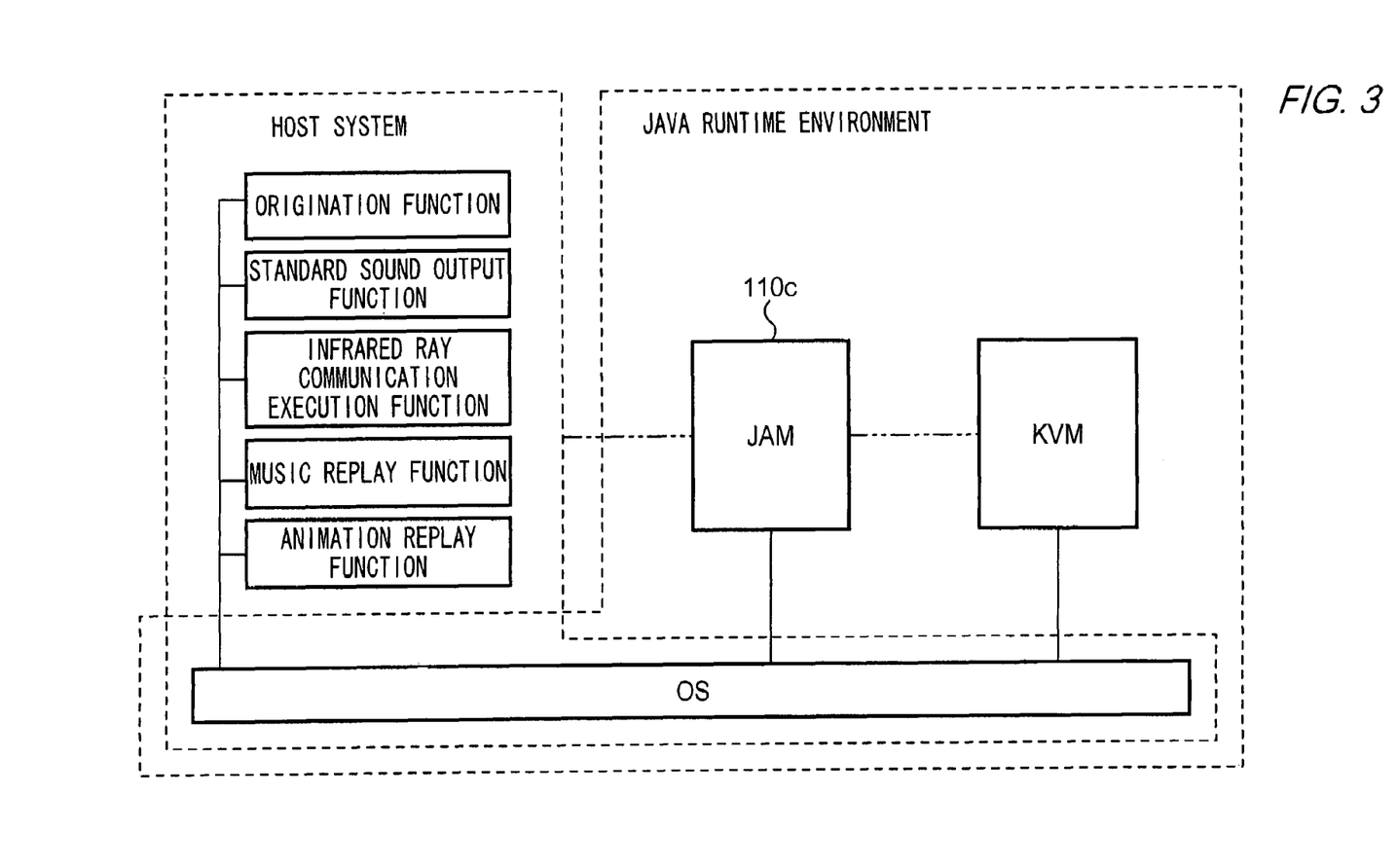
FIG. 3 is a diagram denoting a relationship of some functions run by mobile phone 10.

FIG. 3 is a diagram denoting a relationship of some functions run by mobile phone 10. As shown in FIG. 3, the functions run by mobile phone 10, in compliance with native software, are configured by either a host system or a Java execution environment. Further, as is clear from FIG. 3, only the OS has both a host system and a Java execution environment When an instruction indicated by an output signal from operation input unit 102 is a request to execute non-Java AP, the OS reads out a native APP for executing non-Java AP from non-volatile memory 110.

Further, the OS executes or terminates non-Java AP when receiving a request for executing or terminating non-Java AP. Further, when the OS receives an inquiry from JAM 110c as to whether non-Java AP is running in a host system, the OS provides, to JAM 110c, either information indicating that non-Java AP is configuring a host system, or information indicating that there is no non-Java AP configuring the host system.

A Java execution environment executes Java APPs, and KVM, which is the configuration element of a Java execution environment, is a JVM (Java Virtual Machine) designed for small electronic devices which has restrictions with regard to storage capacity, processing speed, and power consumption. KVM runs Java AP in mobile phone 10 in compliance with byte codes having Java APPs.

Also, KVM provides to Java AP, API (Application Interface) for accessing resources in mobile phone 10. Java AP can use resources such as an origination function, a standard sound output function, an infrared ray communication execution function, a music replay function, and an animation replay function through API. Further, unlike other non-Java AP, KVM is executed when an execution instruction of Java AP (=running Java APPs) is input in the OS.

In accordance with a user's instruction, JAM 110c downloads a JAR file including Java APPs and an ADF (Application Descriptor File) through a mobile communication network, and writes them in non-volatile memory 110.

Further, when JAM 110c receives an instruction for running Java APPs stored in non-volatile memory 110, JAM 110c reads out, from non-volatile memory 110, an ADF corresponding to a Java APP, and enables KVM to run a Java APP by referring to an appClass key in the ADF. A main class name of a Java APP is allocated to an appClass key in an ADF, and KVM is designed for running a Java APP having a main class name provided from JAM 110c. Further, JAM 110c manages the running of Java APPs, and performs a display process which displays a list of executable Java APPs or the meditation process which provides to the OS a request with regard to the use of resources from KVM.

In the above mediation process, when JAM 110c receives an execution request for executing a specific non-Java AP (resource) from KVM, JAM 110c inquires of a host system as to whether non-Java AP (non-resource) is running, determines on the basis of a response to the inquiry whether an execution request from KVM is accepted, and has a function of providing the result of the determination to KVM. Such a determination is not always made on the basis of a response to an inquiry. In some cases, the determination may be made on the basis of native priority information 110a or a user's instruction. Further, in some cases, the information may not be notified to KVM. Parameters for making such determinations will be described in detail in the following description of the operation of the present embodiment.

<1-2. Operation>

Next, the operation of the embodiment will be described. It is assumed that the OS and Jam 110c are already running. Further, it is assumed that a Java APP (hereafter, referred to as "first Java APP") is stored in non-volatile memory 110 of mobile phone 10. Java AP (hereafter, referred to as "first Java AP"), executed in compliance with a first Java APP, displays an input screen on crystal display unit 106 and prompts a user to input instructions. Then, the first Java AP requests to execute an origination function after the user inputs instructions. Further, when the first Java AP detects the occurrence of exception "S8", the first Java AP displays, on crystal display unit 106, a screen notifying the user that an execution request of an origination function is cancelled because a resource conflict has occurred between the first Java AP and a communication already performed. Also, it is assumed that non-volatile memory 110 stores a Java APP (hereafter, referred to as "second Java APP") for executing Java AP (hereafter, referred to as "second Java AP") which has the same function as that of the first Java AP.

1-2-1. Operation Example 1

Figure 4:
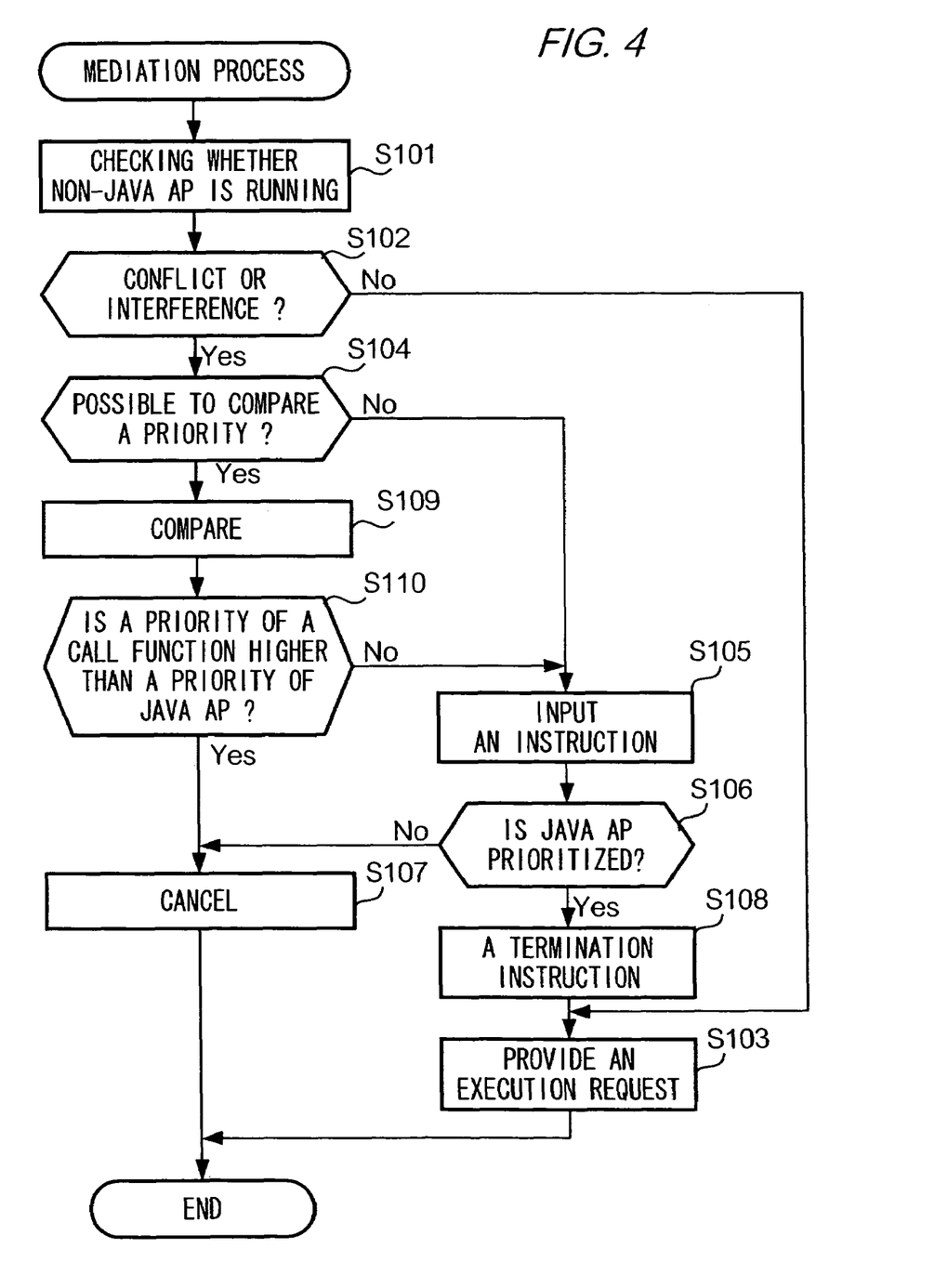
FIG. 4 is a flowchart denoting a mediation process in mobile phone 10.
Figure 6:
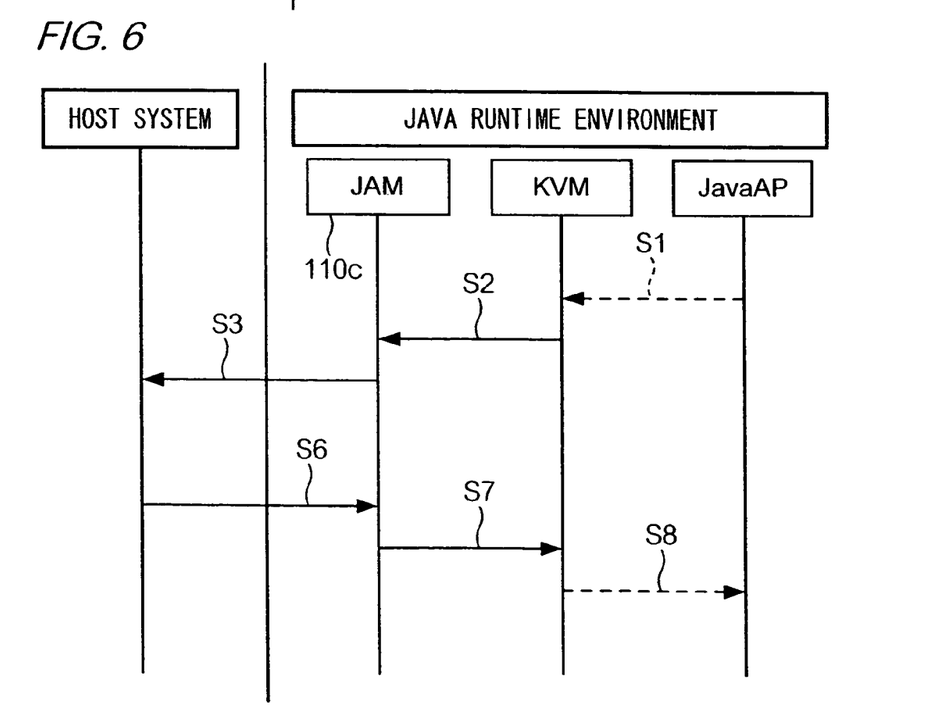
FIG. 6 is a sequence diagram explaining the operation of mobile phone 10.
Figure 7:
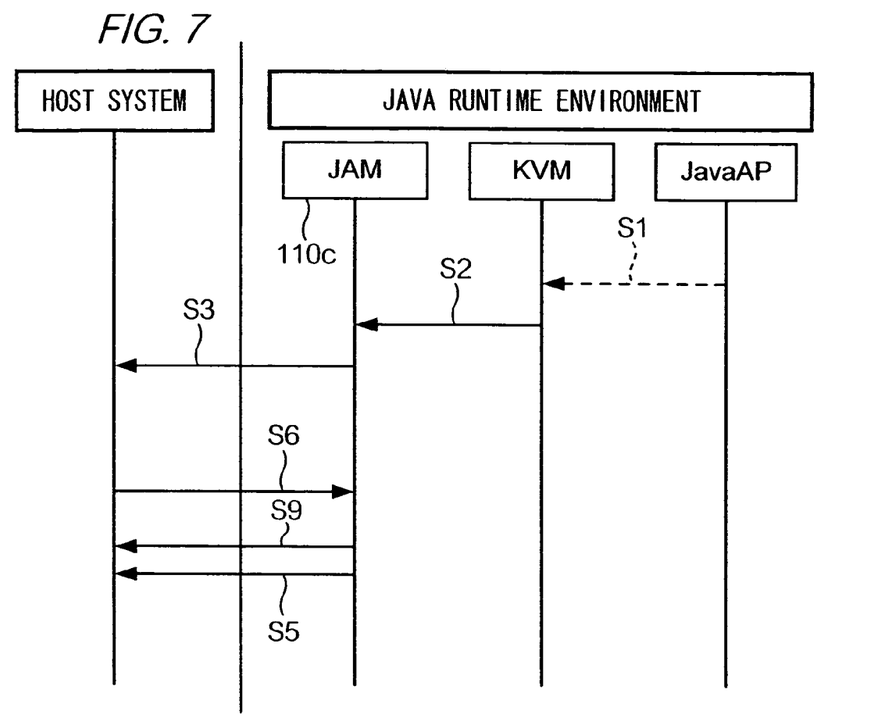
FIG. 7 is a sequence diagram explaining the operation of mobile phone 10.

With regard to the operation of mobile phone 10, in a case that non-Java AP using an origination function is not executed when the first Java AP requests to execute an origination function, the operation prior to execution of the first Java AP will be described with reference to FIG. 4 and FIG. 5. FIG. 4 is a flowchart denoting the mediation process run by JAM 110c, and FIG. 5 to FIG. 7 are sequence figures showing how mobile phone 10 is operated.

First, when an instruction is input to mobile phone 10 by a user of operation input unit 102, JAM 110c is executed in mobile phone 10. Then, JAM 110c displays, on crystal display unit 106, a list of Java APPs stored in non-volatile memory 110. The user selects the first Java APP from the list by using operation input unit 102, and inputs an instruction for executing Java AP.

On the basis of the above instruction, JAM 110c refers to ADF corresponding to the selected Java APP, and executes KVM by designating a main class name designated by an AppClass key in ADF. KVM reads out a JAR file corresponding to the designated main class name, and executes a Java APP in a JAR file. Consequently, an input screen is displayed by Java AP. Then, a user inputs an instruction in accordance with an input screen display by using operation input unit 102.

Figure 5:
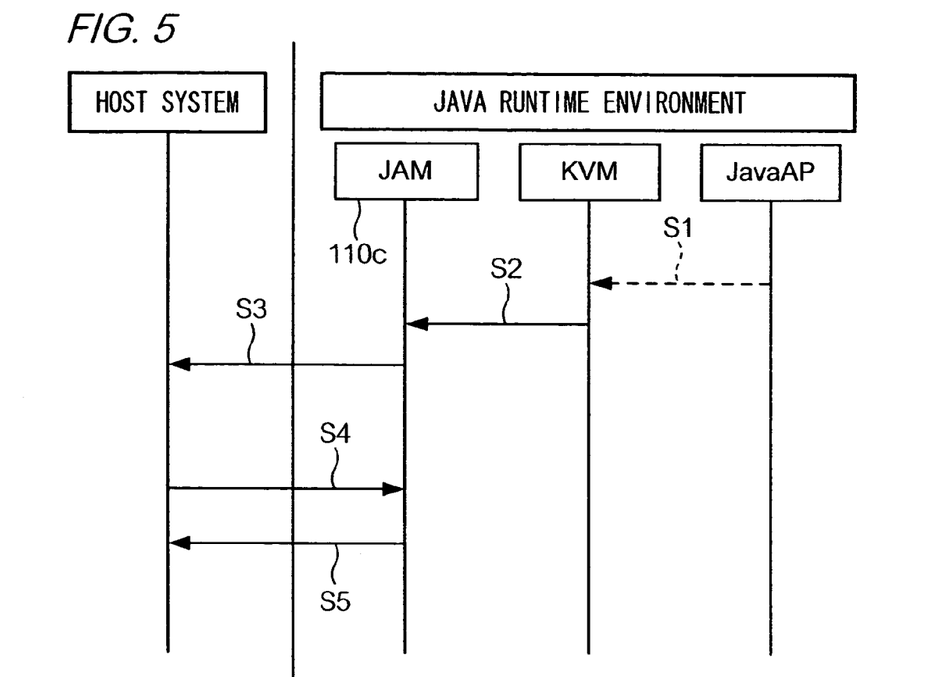
FIG. 5 is a sequence diagram explaining the operation of mobile phone 10.

When a user inputs an instruction, the first Java APP calls a call method of a phone class which is a plurality of elements which configure a class library (S1 in FIG. 5). Accordingly, KVM provides, to JAM 11Oc, the main class name designated at the time of executing KVM, together with request data S2 indicating a request for executing an origination function. JAM 110c provides to the OS inquiry data S3 for inquiring whether non-Java AP is running in a host system. Then, the OS checks whether non-Java AP is running in the host system, and provides to Jam 110c result data S4 indicating whether non-Java AP is running in the host system (S101 in FIG. 4).

Since the result data S4 indicates that non-Java AP using an origination function is not running, JAM 110c determines that no conflict, or no interference will occur (S102:No), and provides to the host system, request data S5 obtained by extracting only data from request data S2 provided by KVM, the data indicating a request for executing an origination function (S103). Consequently, an origination function is executed in a host system. Here, the conflict which occurs with regard to using resources is that a plurality of APs attempt to use a single resource (e.g. an origination function, or a communication speaker). Also, when a combination of resources is used, interference is caused by the use of a plurality of user interfaces. For example, a combination of music replay and sound communication cause interference.

1-2-2. Operation Example 2

Next, the operation of mobile phone 10 will be described with reference to FIG. 4, FIG. 5, and FIG. 7 in a case that a call function (=non-Java AP) using an origination function is already executed when the first Java AP requests to execute an origination function.

In this case, in contrast with result data S4 described above, result data S6 provided to JAM 110c from a host system (refer to FIG. 6) indicates that non-Java AP using an origination function is already executed. Therefore, JAM 110c determines that conflict or interference will occur with regard to using resources (S102:Yes), and determines whether a priority is provided to both a call function, and to Java AP specified by a main class name and indicated by request data S2(S104). Since the first Java AP is non-native AP, priority information indicating a priority is not stored in non-volatile memory 110. Consequently, the determination result is NO (S104 No).

Next, JAM 110c displays on crystal display 106, a screen for inquiring of a user as to whether Java AP is processed by priority, not a call function, and waits for an instruction to be input by the user. Then, when the user inputs an instruction (S105), JAM 110c checks the instruction (S106). Cases depending on each instruction will be described below.

<A. Instruction Which Processes a Call Function by Priority>

When an instruction input by a user is an instruction for processing a call function by priority, not the first Java AP (S106: No), JAM 110c executes the cancellation process. That is to say, an execution request indicated by request data S2 is cancelled, and notification data S7 is provided to KVM (S107). KVM indicates exception "S8" to the first Java AP which generates a call method. The first Java AP detects the occurrence of exception "S8", and displays on crystal display unit 106 a screen notifying that a request for executing an origination function is cancelled because a resource conflict has occurred between the first Java AP and a communication already performed.

<B. Instruction Which Processes the First Java AP by Priority>

When an instruction input by a user is an instruction for processing the first Java AP by priority, not a call function (S106: Yes), as shown in FIG. 7, JAM 110c provides, to a host system, termination instruction data S9 for instructing to terminate a call function (S108) together with request data S5 described above (S103). Consequently, in the host system, an origination function is executed after a call function is terminated.

1-2-3. Operation Example 3

Next, with reference to FIG. 4, the operation of mobile phone 10 will be described in a case that a call function using an origination function has already been executed when the second Java AP requests to execute an origination function. Here, a flow of data reception and transmission among Java AP and KVM and JAM 110c is the same as that of FIG. 6 and FIG. 7.

In this case, at the time of executing the second Java AP, a main class name provided to KVM is the main class name of the second Java AP, and KVM executes the second Java AP. Since the function of the second Java AP is the same as that of the first Java AP, the data transmitted and received among Java AP and KVM and JAM 110c is the same as that of "Operation Example 2", with the exception of the main class name.

"Operation Example 3" differs from "Operation Example 2" with regard to the determination as to whether a priority is provided to a call function, and to Java AP specified by a main class name and indicated by request data S2 from KVM (S104). Since the second Java AP and the call function are native APs, native priority information 110a stored in non-volatile memory 110 indicates a priority for the second Java AP and the call function. Therefore, the determination result is "Yes" (S104: Yes).

Next, JAM 110c compares the priority for the second Java AP with the priority for the call function (S109), and determines whether the priority for the call function is higher than the priority for the second Java AP(S110). When it is determined that the priority for the call function is higher (S110: Yes), JAM 110c executes the cancellation process in S107. Conversely, when the it is determined that the priority for the call function is not higher (S110: No), JAM 110c displays on crystal display unit 106 a screen for inquiring of a user as to whether to process Java AP by priority, and waits for an instruction to be input by the user (S105). The operation after the user's instruction is the same as that of Operation Example 2.

<1-3. Supplement>

As described above, according to the first embodiment, the problems of "conflict" and "interference" are solved. Additionally, since the cancellation of an execution request is immediately notified to Java AP or to a user, Java AP or the user can execute the next process. Further, since an execution request is executed, or canceled on the basis of AP priority using resources, and AP priority requesting to execute resources, that the problem of interruption of important AP by non-important AP is avoided. Further, since AP termination using resources which may cause conflict or interference is executed on the basis of a user's instruction, loss of unwanted data is also avoided. Further, in a case that a priority of AP using resources is higher than a priority of AP requesting to execute resources, since an execution request is cancelled without a user's instruction, it is not always necessary to wait for an instruction to be input by a user. Such a function is advantageous when, for example, a user mistakenly executes a low priority Java AP requesting to execute an origination function while using a call function with a high a priority.

In general, in a case that Java APPs provided by third parties, other than a maker or a distributor of mobile phone 10, are downloaded to and used in mobile phone 10, there is a high probability of conflict or interference occurring. From this point of view, the present invention is practical since conflict or interference are reliably solved, even in the case described above.

Further, the first embodiment may be modified as follows:

(1) The determination as to whether an execution request is executed or cancelled is made merely on the basis of an inquiry result to a host system and a priority. In this case, with regard to AP to which a priority is not provided, it is assumed that a low a priority is provided to AP.

(2) In a case that a priority is provided to both APs to be compared, the determination as to whether an execution request is executed may be made on the basis of only a priority. In a case that a priority provided to both APs is the same, for example, the determination of an execution request is made such that the AP already using resources is executed by priority.

(3) In a case that conflict or interference occurs without using a priority, JAM 110c always waits for an instruction to be input by a user.

2. Second Embodiment

<2-1. Configuration>

Figure 8:
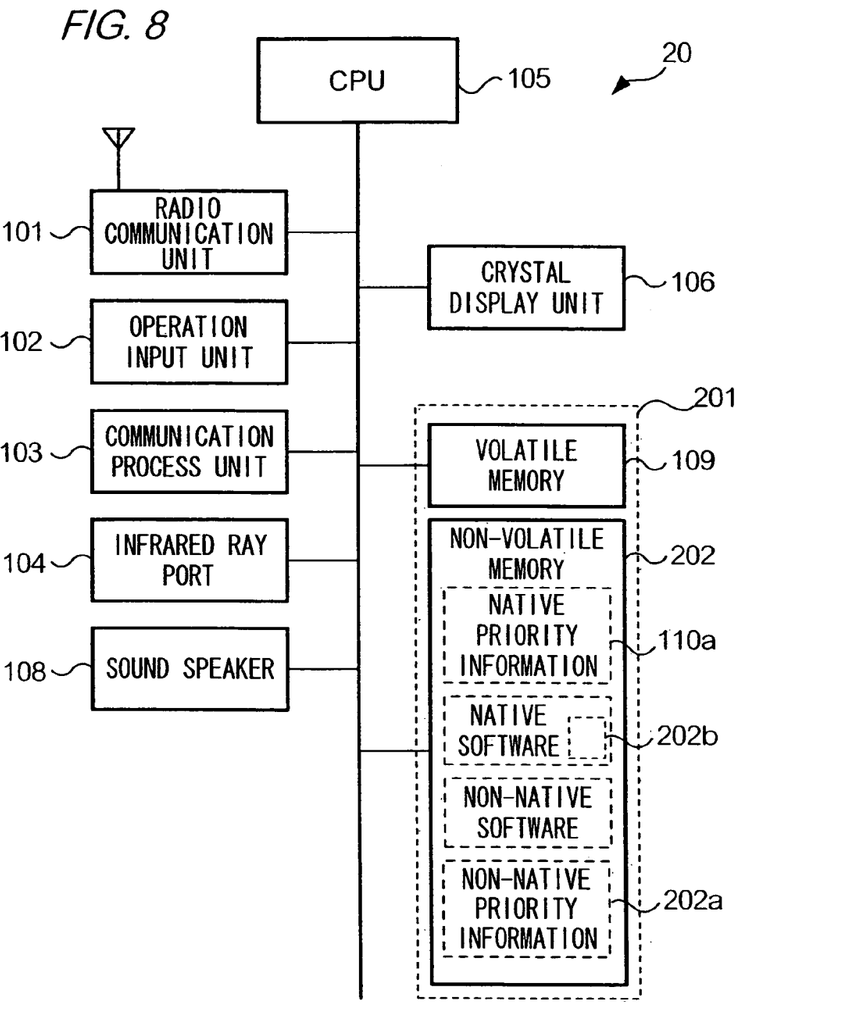
FIG. 8 is a block diagram denoting the hardware configuration of mobile phone 20 according to the second embodiment of the present invention.
Figure 9:
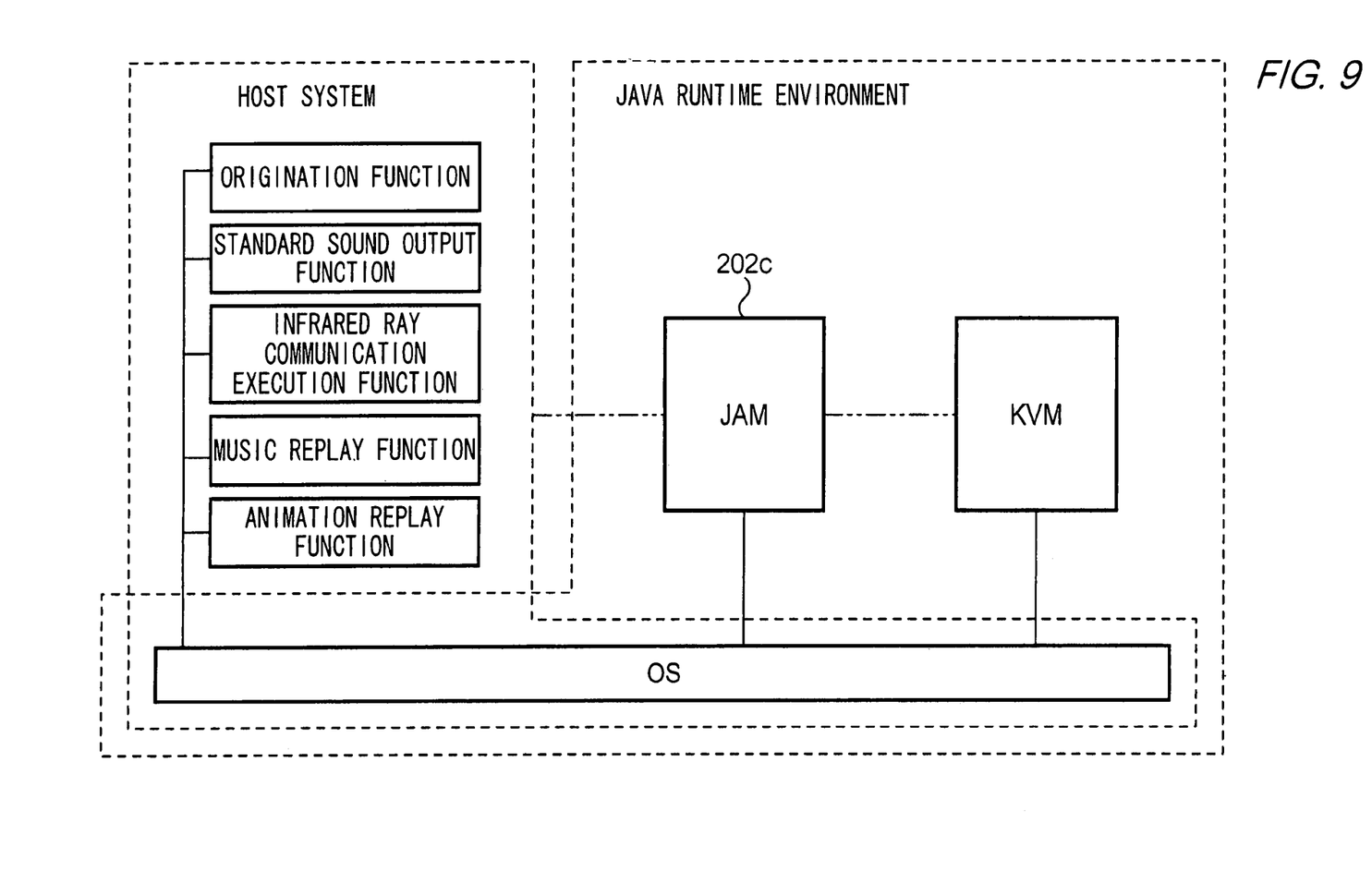
FIG. 9 is a diagram denoting a relationship of a part of functions to be run in mobile phone 20.

FIG. 8 is a block diagram denoting the hardware configuration of mobile phone 20 according to the second embodiment of the present invention. FIG. 9 is a diagram indicating a relationship of some functions run by mobile phone 20. The only point in which mobile phone 20 differs from mobile phone 10 is that mobile phone 20 is comprised of non-volatile memory 202 in place of non-volatile memory 110. The points in which non-volatile memory 202 is different from non-volatile memory 110 are that non-native priority information 202a is written in non-volatile memory 202, and JAM program 202b is written in non-volatile memory 202 in place of JAM program 110b.

Figure 10:
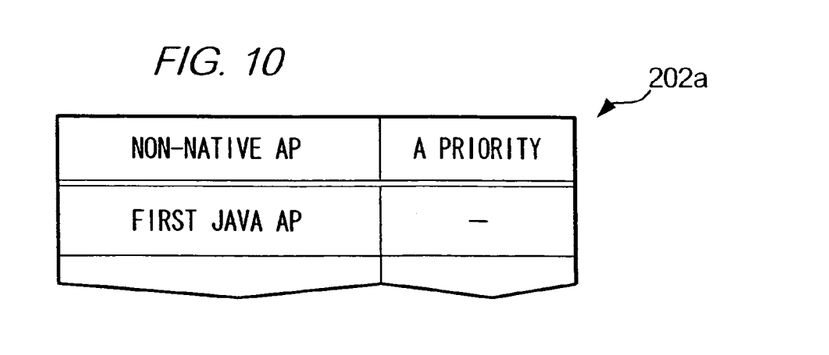
FIG. 10 is a diagram denoting an example of native priority information 202a in mobile phone 20.

Non-native priority information 202a indicates a priority of each non-native AP. An example of non-native priority information 202a is shown in FIG. 10. As non-native priority information 202a in mobile phone 20 is initialized and contains no information at the time of purchase, an example is shown of non-native priority information 202a, after non-native APP is written in non-volatile memory 202.

In comparison with JAM 110c, JAM 202c executed in compliance with JAM program 202b has a function of initializing non-native priority information 202a. A further difference is that JAM 202c refers to non-native priority information 202a at the time of determining whether an execution request is executed, and JAM 202c updates non-native priority information 202a. The process of updating non-native priority information 202a will be described in the operation of the second embodiment.

2-2. Operation

Next, the second embodiment will be described with reference to FIG. 8 to FIG. 12. Here, the operations to be described are the same as those of the first embodiment. The content of native priority information 110a is the same as that of FIG. 2, and non-native priority information 202a is initialized. Further, the first Java APP is already stored in non-volatile memory 110. Further, when the first Java AP requests to execute an origination function, a call function (non-Java AP) using an origination function is already executed.

Figure 11:
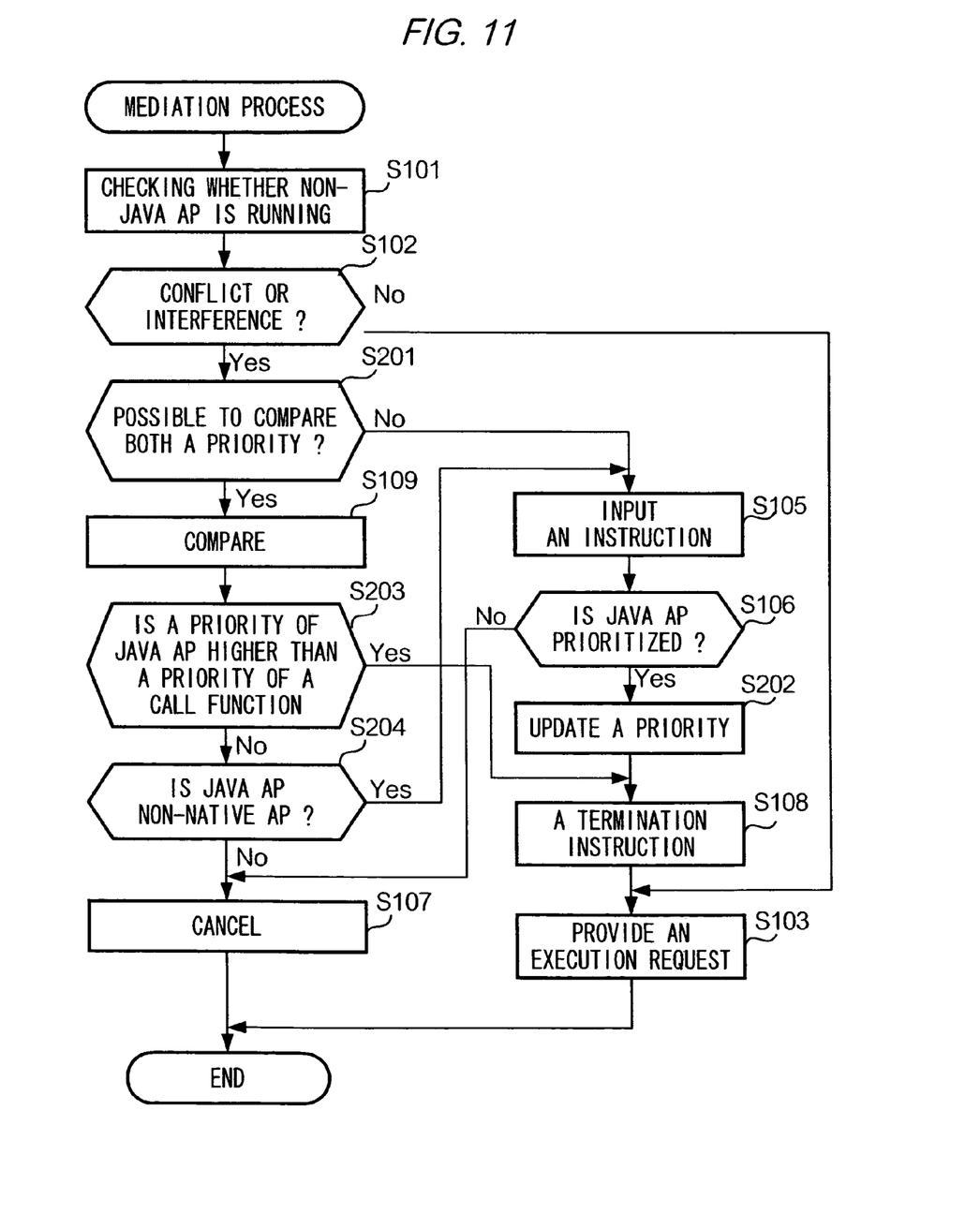
FIG. 11 is a flowchart denoting a mediation process in mobile phone 20.

A flow of the second embodiment is the same as that of the first embodiment up to the point that JAM 202c waits for a user's instruction as to whether to process the first Java AP by priority (S105). JAM 202c is run in the same manner as JAM 110c in a case that the user's instruction is to process a call function by priority. Conversely, in a case that the user's instruction is to process the first Java AP by priority, JAM 202c is run in the same manner as JAM 110c (S108, S103), and updates non-native priority information 202a for providing, to the first Java AP, the priority 5, which is greater than 4 (4 is a priority of a call function in FIG. 2) by 1 (S202).

Next, it is assumed that the first Java AP is executed during the running of a call function after the termination of the first Java AP, and that the first Java AP requests to execute an origination function. In this case, since a priority is provided to a call function and the first Java AP (S201:Yes), a call function and the first Java AP are compared (S109), and JAM 202c determines whether a function requesting to use a resource is unconditionally processed by priority (S203). The determination is "Yes" only when a function of a priority requesting to use a resource is higher than a function of a priority already using a resource. Since the priority of the call function is 4, and the priority of the first Java AP is 5, the determination result in S203 is Yes (S203:Yes). Accordingly, the call function is terminated, and an origination function is used by the first Java AP without waiting for the user's instruction (S108, S103).

Next, it is assumed that the first Java AP is executed during the running of an infrared ray communication function, whose priority is 6, after the termination of the first Java AP, and the first Java AP requests to execute an infrared ray communication function which is controlled by an infrared ray communication execution function. In this case, as a priority of the first Java AP is 5, the determination result in S203 is No. Then, JAM 202c determines whether the first Java AP is non-native AP (S204). The determination is made on the basis of whether a priority of the first Java AP is indicated in native priority information 110a, or in non-native priority information 202a. Since the first Java AP is non-native AP (S204: Yes), the operation is the same as that of JAM starting from S105. As a result, in a case that a user's instruction is to process the first Java AP by priority, a priority of the first Java AP is 7, since JAM 202c refers to a priority of infrared ray communication function in place of a priority of a call function in FIG. 2 for updating a priority of the first Java AP.

Next, it is assumed that the second Java AP is executed during the running of a call function after the termination of the first Java AP, and that the second Java AP requests to execute an origination function. In this case, since the second Java AP is native AP (S204: No), JAM202c executes the cancellation process(S107). That is to say, the request by the second Java AP is cancelled.

Figure 12:
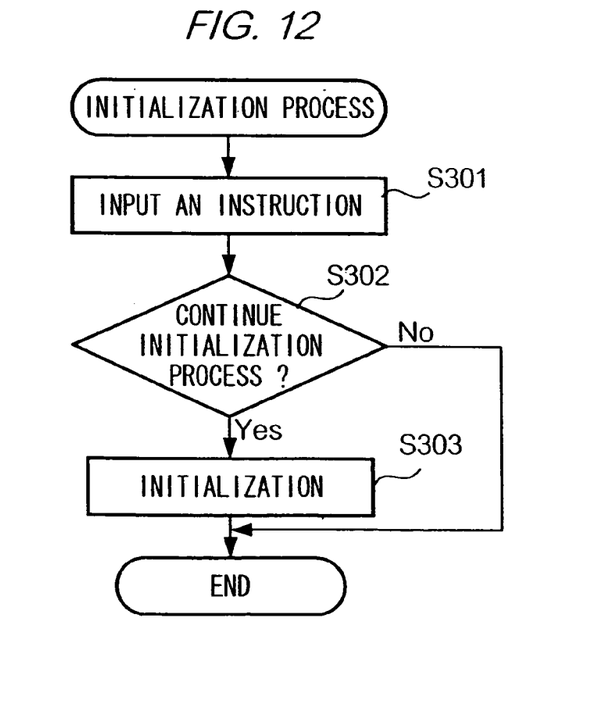
FIG. 12 is a flowchart denoting an initialization process in mobile phone 20.

Next, it is assumed that the second Java AP is terminated, and the initialization is executed in accordance with instructions input by the user. In the initialization process, JAM202c displays, on crystal display unit 106, a screen for inquiring as to whether a user still requires to initialize a priority, and waits for an instruction to be input by the user. When the user inputs an instruction (S301), JAM202c checks the instruction details (S302). JAM202c executes an initialization process only if an instruction indicates that it is still necessary to initialize a priority (S302: No), and initializes non-native priority information 202a (S303).

Next, it is assumed that the first Java AP is executed during the running of a call function, and that the first Java AP requests to execute an origination function. In this case, since non-native priority information 202a is initialized, a priority is not provided to the first Java AP (S201: No). JAM 202c is run in the same manner as JAM 110c starting from S105.

<2-3. Supplement>

In the second embodiment, the effects which differ from the first embodiment will be described.

First, a priority can be provided to non-native AP not having a priority. Further, in a case that non-native AP whose priority is higher than native AP using a resource requests to execute a function, the function is executed without waiting for a user's instruction. Therefore, it is not always necessary to wait for an instruction to be input by a user.

Further, in the second embodiment, a priority of non-native AP is determined on the basis of a user's instruction executed at the time of changing AP using a resource. That is to say, when a priority of non-native AP is determined, it is not necessary for users to select AP to be compared with non-native AP, or to determine a priority. Accordingly, a priority of non-native AP is determined without the necessity of input by a user.

Further, the second embodiment may be modified as follows:

(1) In the second embodiment, a priority which is higher by 1 than that of AP to which it is compared, is provided to non-native AP permitted to use a resource. However, if a priority which is a lot higher than AP to be compared, is provided to non-native AP, a process which is very different from a user's instruction may be executed. Therefore, ideally, a minimal priority is provided to non-native AP. Also, it is possible to set a limitation to a priority of non-native AP.

(2) In the second embodiment, an unconditional priority is provided to non-native AP; however, the priority may be flexible. For example, a priority of non-native AP may be 2 for native AP(a), and a priority of non-native AP may be 3 for native AP(b).

(3) In the second embodiment, a priority is set to each non-native AP; however, the same priority may be set to each non-native AP in a case that it is not necessary to control non-native AP in a precise manner.

(4) Because non-volatile memory 110 is configured by a non-rewritable non-volatile memory and a rewritable non-volatile memory, and native priority information 110a is stored in a non-rewritable non-volatile memory, and non-native priority information 202a is stored in a rewritable non-volatile memory, it is also possible to protect the rewriting of a priority of native AP.

3. Modifications

The first and second embodiments may be modified as follows:

(1) JAM may notify the reason for cancellation of an execution request to Java AP requesting an execution through KVM. As a result, the representation capability of Java AP is improved. For example, in a case that Java AP is designed to display a cancellation reason of an execution request, or information indicating all non-Java AP which is running, users can make selections flexibly (e.g. an execution request is cancelled because a line is busy, or an infrared ray communication is performed).

(2) In the above embodiments, an execution request from Java AP is to be cancelled; however, under the condition that non-Java AP requests to execute Java AP, an execution request from non-Java AP may be cancelled. This modification is possible because KVM or JAM recognizes a resource used by Java AP, and JAM receives an execution request from non-Java AP, and determines whether to execute or cancel an execution request.

(3) In the above embodiments, Java AP requests to execute non-Java AP (resource); however, non-Java AP may also request to execute non-Java AP (resource). In this case, except for a case where a program equivalent to JAM receives an execution request from non-Java AP, and provides notification to non-Java AP if an execution request is cancelled, it is necessary to design a program equivalent to JAM to be performed in the same manner as JAM.

(4) Further, Java AP may be specified by using an identifier different from a main class name.

(5) In the above embodiments, a mobile phone is exemplified as a terminal device however, a terminal device is not limited to a mobile phone.

(6) In the above embodiments, programs for executing JAM are pre-stored in memory unit 107; however, programs may be downloaded through a communication network, and written in memory unit 107. Further, as a recording media in which programs are recorded is installed in mobile phone 10, JAM is executed in compliance with programs installed in mobile phone 10.

(7) In the above embodiments, a priority is provided to each native AP; however, the same priority is set to each native AP in a case that it is not necessary to control native AP in a precise manner. Even in this modification, it is also possible that all native APs are processed by priority over all non-native APs, or specified native APs are processed by priority over all non-native AP.

(8) In the above embodiments, operations are controlled by focusing on whether an application is native AP or non-native AP; however, they may be controlled depending on types of recording medias storing APPs. For example, in a case that a priority is compared with regard to APPs stored in a non-rewritable memory (e.g. ROM: Read Only Memory), it is possible to determine whether to execute or cancel a request without waiting for a user's input. Further, a high priority may be provided to APPs stored in a non-rewritable memory, and a low priority may be provided to APPs stored in a rewritable memory. Further, the same priority may be set to APPs stored in a non-rewritable memory.

The invention claimed is:

1. A terminal device comprising:
   a storage unit that stores an indicator representative of a priority of an application;
   a detector that detects a request for use of a resource by a first application, the resource being used by a second application;
   a determination unit that determines a relative priority of the first and second applications upon detection of a conflict, by comparing indicators of the first and second applications;
   a controller that rejects the request of said first application when a priority of the first application is lower than a priority of the second application;
   a notifying unit that notifies a user of the terminal device of the rejection of the request of the first application;
   a user input that enables the user to input an instruction; and
   a display that displays a message to prompt the user to input an instruction, when the determination unit fails to determine that the priority of the first application is higher than the second application,
   wherein the controller determines whether to accept the request of the first application according to the instruction input via the user input, and
   wherein when the instruction represents acceptance of the request of the first application, at least one of the indicators stored in the storage unit is updated.

2. The terminal device of claim 1, wherein the determination unit fails to determine that the priority of the first application is higher than the second application when the indicator of the priority of the first application is equal to or less than the indicator of the priority of the second application.

3. The terminal device of claim 1, wherein the determination unit fails to determine that the priority of the first application is higher than the second application since at least one of the indicators of the priority of the first or second applications are not stored in the storage unit thereby resulting in the determination unit failing to determine relative priority; and
   wherein when the determination unit fails to determine the relative priority, the controller determines whether to accept the request of the first application based only on the instruction.

4. The terminal device of claim 1, wherein when the instruction represents acceptance of the request of the first application, the indicator for the first application is updated to be greater than the indicator of the second application.

5. The terminal device of claim 1, wherein the resource comprises a hardware resource.

6. The terminal device of claim 1, wherein the resource comprises a network resource.

7. The terminal device of claim 6, wherein the network resource comprises a radio channel for communication with a mobile communication network.

8. The terminal device of claim 6, wherein the network resource comprises a packet transmission line.

9. A method for resolving conflicts in using a resource on a terminal device, the method comprising:
   storing an indicator representative of a priority of an application;
   detecting a request for use of a resource by a first application, the resource being used by a second application;
   determining a relative priority of the first and second applications upon detection of a conflict, by comparing indicators of the first and second applications;
   rejecting the request of the first application when a priority of the first application is lower than a priority of the second application;
   notifying a user of the terminal device of the rejection of the request of the first application;
   when it is not determined that the priority of the first application is higher than the second application, displaying a message to prompt the user to input an instruction;
   receiving an input of an instruction via a user input; and
   determining whether to accept the request of the first application according to the instruction input via the user input, wherein when the instruction represents acceptance of the request of the first application, at least one of the indicators stored in the storage unit is updated.

10. The method of claim 9, wherein it is not determined that the priority of the first application is higher than the second application when the indicator of the priority of the first application is equal to or less than the indicator of the priority of the second application.

11. The method of claim 9, wherein it is not determined that the priority of the first application is higher than the second application since at least one of the indicators of the priority of the first or second applications is not stored in a storage unit in the terminal device thereby resulting in a failure to determine relative priority; and wherein, when there is a resulting failure in determining the relative priority, determining whether to accept the request of the first application is performed solely based on the instruction input.

12. The method of claim 9, wherein when the instruction represents acceptance of the request of the first application, the indicator for the first application is updated to be greater than the indicator of the second application.

13. The method of claim 9, wherein the resource comprises a hardware resource.

14. The method of claim 9, wherein the resource comprises a network resource.

15. The method of claim 14, wherein the network resource comprises a radio channel for communication with a mobile communication network.

16. The method of claim 14, wherein the network resource comprises a packet transmission line.

* * * * *

UNITED STATES PATENT AND TRADEMARK OFFICE
CERTIFICATE OF CORRECTION

PATENT NO.         : 7,526,766 B2
APPLICATION NO. : 10/850867
DATED                 : April 28, 2009
INVENTOR(S)       : Mao Asai et al.

It is certified that error appears in the above-identified patent and that said Letters Patent is hereby corrected as shown below:

On the Title Page

Item (75), inventors: replace "Yokosuka" with --Yokosuka-shi--; replace "Sayama" with --Sayama-shi--; replace "Tokyo" with --Shinagawa-ku--.

Page 2, column 2, lines 2-3, under "OTHER PUBLICATIONS", replace "012 239.2-1243" with --04 012 239.2-1243--.

Page 2, column 2, under "OTHER PUBLICATIONS", insert --EP Search Report issued October 5, 2007 in European application number 0412239.2--.

Signed and Sealed this

Fourth Day of August, 2009

JOHN DOLL
*Acting Director of the United States Patent and Trademark Office*